United States Patent [19]

Mentzer et al.

[11] Patent Number: 4,828,637
[45] Date of Patent: May 9, 1989

[54] METHOD OF APPLYING PAINTED CARRIER FILMS TO AUTOMOBILE BODY PARTS

[75] Inventors: Charles C. Mentzer; Howard W. Cox, both of Birmingham; William T. Short, Southfield, all of Mich.

[73] Assignee: General Motors Corporation, Detroit, Mich.

[21] Appl. No.: 162,744

[22] Filed: Mar. 1, 1988

Related U.S. Application Data

[63] Continuation-in-part of Ser. No. 881,344, Jul. 2, 1986, abandoned.

[51] Int. Cl.$^4$ .................... B32B 31/12; B32B 31/20; B32B 31/26
[52] U.S. Cl. .................... 156/212; 156/216; 156/285; 156/286
[58] Field of Search .............. 156/212, 213, 216, 285, 156/280, 286, 278, 298; 280/762, 768, 770, 785; 428/458, 463; 425/389, DIG. 19

[56] References Cited

U.S. PATENT DOCUMENTS

| | | |
|---|---|---|
| 3,026,232 | 3/1962 | Finch . |
| 3,551,232 | 12/1970 | Thompson . |
| 3,654,012 | 4/1972 | Schlager . |
| 3,827,130 | 8/1974 | Baumann . |
| 4,052,241 | 10/1977 | Walter . |
| 4,194,938 | 3/1980 | Figge et al. . |
| 4,496,628 | 1/1985 | Deatcher et al. . |
| 4,548,843 | 10/1985 | Kozuka et al. . |
| 4,594,292 | 6/1986 | Nagai et al. . |
| 4,601,941 | 7/1986 | Lutz et al. . |

Primary Examiner—Merrell C. Cashion, Jr.
Attorney, Agent, or Firm—Randy W. Tung

[57] ABSTRACT

A method of applying a prepainted carrier film to an automobile body part in a vacuum thermoforming process. The prepainted carrier film has a top surface painted by a color coat formulation not containing any flakes and then coated with a layer of clear coat having a thickness of no less than 10 microns. The prepainted carrier film is heated and stretched in a vacuum thermoforming process and then assembled to a substrate for an automobile body part by adhesive means. The clear coat layer retains substantially the same gloss and color appearance of the stretched prepainted carrier film as prior to the such stretch.

4 Claims, 5 Drawing Sheets

METHOD OF APPLYING PAINTED CARRIER FILMS TO AUTOMOBILE BODY PARTS

This is a continuation-in-part of U.S. Ser. No. 881,344, filed July 2, 1986, which is being abandoned.

FIELD OF THE INVENTION

The present invention generally relates to a method of applying a painted carrier film to an automobile body part and, more particularly, is concerned with a method of applying a painted carrier film to an automobile body part by a thermoforming process in which our novel process enables the retainment of substantially the same color and gloss appearance after the painted carrier film has been stretched up to a strain of one hundred percent.

BACKGROUND OF THE INVENTION

Automobile body parts are traditionally made of sheet metal or plastics painted with layers of pigmented paints. The painting process of these parts requires elaborate facilities and consequently large expenses. For instance, a large floor space area must be maintained in a clean room environment for the spraying of paint and clear coat and for the baking and curing of such paint and clear coat on the body parts. Moreover, solvent based paints are considered undesirable in recent years because of environmental concerns. As a consequence, the evaporation of such solvents must be strictly controlled. It is, therefore, desirable to eliminate the painting process completely in an automobile assembly plant by using prepainted carrier films. These prepainted carrier films may be applied to prefabricated vehicle body parts in a vacuum thermoforming process.

In the development of a vacuum thermoforming process to assemble a prepainted carrier film to a prefabricated vehicle body part, problems of various nature were encountered. First, in a process where a two dimensional prepainted carrier film is assembled to a three dimensional vehicle body part, it is inevitable that the carrier film must be stretched. The amount of stretch, or the total strain of the carrier film resulted from such stretch varies from a few percent in the case of a flat body panel to as high as one hundred percent in a curved panel with sharp corners. We have found that for most automobile body part applications, the total strain is in the range between 10 to 50 percent.

When a carrier film covered with a color coat is stretched in the vacuum thermoforming process and assembled to a vehicle body part, the color and gloss appearance of the assembled part deteriorates significantly from that of the original unstretched prepainted carrier film. For instance, we have found that in the case of a metallic silver color basecoat, the 20° gloss reading dropped from 87 for an unstretched carrier film to 25 for a carrier film stretched to 50% strain. It is known by those skilled in the art of color matching that such a deterioration in gloss produces a part of unacceptable color appearance.

We have discovered that one possible solution to remedy the deterioration in gloss is by using a clear coat. Clear coats of various chemical nature are available in the market. However, a serious problem was encountered when clear coats are sprayed on a stretched carrier film covered with a color coat. We discovered that since most clear coat formulations contain one or more organic solvents, i.e. ketones, esters, etc., severe stress cracking problems in the color coat layer were observed when these clear coats were sprayed on a stressed color coat layer. We believe that the organic solvents contained in the clear coats initiate crack growth in an already stressed color coat layer which contains micro-cracks. This stress cracking in the color coat layer can cause deterioration in the color appearance to such an extent that the color of the automobile part is no longer acceptable.

It is, therefore, an object of the present invention to assemble prepainted carrier films to automobile body parts in a vacuum thermoforming process.

It is another object of the present invention to assemble prepainted carrier films to automobile body parts in a vacuum thermoforming process in which even though the films and the color coat layer on it are stretched, substantially the same gloss and color appearance are retained after the stretch as prior to the stretch by the use of a clear coat layer.

It is a further object of the present invention to assemble prepainted carrier films to automobile body parts such that all the body parts mounted on an automobile are color matched within an acceptable color tolerance.

SUMMARY OF THE INVENTION

In accordance with a preferred practice of our invention, a method of applying prepainted carrier films to automobile body parts such that all the body parts have the same color appearance can be carried out by the following operative steps. First, a layer of a pigmented paint is applied to a plastic film having sufficient thickness in rigidity. A layer of a clear coat is then applied on top of the paint layer. The uncoated side of this plastic film may then be optionally coated with a layer of adhesive. We believe that instead of coating the film with adhesive, a solid film of adhesive may also be used by placing it in between the plastic film and the substrate for the body part. Such solid films of adhesive include those in a web-like form.

The prepainted carrier film is heated in an oven to a temperature at which the plastic film became sufficiently pliable such that it may be vacuum formed. The temperature must also be sufficiently high such that the adhesive layer on the back of the prepainted film or the separate adhesive film becomes tacky. This heated prepainted film is then positioned over a substrate for a body part in a vacuum forming device. Vacuum is withdrawn from under the prepainted film such that the film wraps around and adheres to the substrate without causing defects such as air bubbles.

In our alternate embodiment, vacuum holes are drilled into a supporting buck for the substrate in such a way that a heated film edge-wraps the substrate so that the edges of the substrate are covered by prepainted film. After the excess film is trimmed off the substrate along the edges of the part, a completed automobile body part with a painted surface is ready for assembly to an automobile.

BRIEF DESCRIPTION OF THE DRAWINGS

Other objects, features and advantages of the present invention will become apparent upon consideration of the specification and the appended drawings, in which.

DETAILED DESCRIPTION OF THE PREFERRED EMBODIMENT

Figure 1:
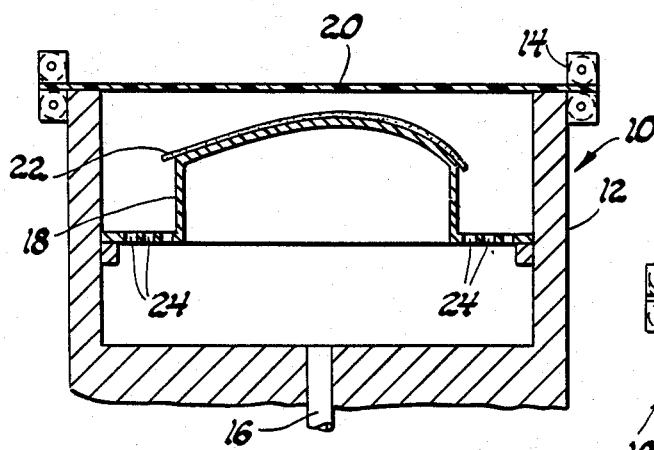
FIG. 1 is a schematic showing a vacuum forming setup wherein a prepainted carrier film is stretched over a substrate to be covered.

Referring initially to FIG. 1 where a schematic of a vacuum former 10 is shown. Vacuum former 10 is constructed of a vacuum box 12, a stretcher frame 14, a vacuum port 16, and a support buck 18. A prepainted carrier film 20 is first loaded into stretcher frame 14 with the paint side up. A substrate 22 which is to be covered by the prepainted carrier film 20 is loaded onto support buck 18. The support buck 18 is mounted on a vacuum plate 24 for the evacuation of air trapped under prepainted carrier film 20. The substrate 22 may be constructed of any material selected from reaction injection moldable urethanes, reaction injection moldable nylons, glass fiber reinforced sheeting molding compounds, injection moldable thermoplastics, and metals.

The carrier film we have used was either an extruded polyurethane film supplied by Dow Chemical Company or a thermoplastic polyester film supplied by Eastman Chemical Products. The thickness of the film is approximately 0.010 inch. The backside of the film was coated with a commercial adhesive that is either heat activated or pressure sensitive. The carrier films were coated by either a spray-paint process or a roll-coat process with a red metallic paint supplied by the PPG Industries, Durethane ® 101. The size of the film samples used was approximately 60 centimeters by 60 centimeters. Some of the carrier films were hand sprayed to an average coating thickness of between 0.001 and 0.004 inch. The cure conditions used for these prepainted carrier film were 110° C. and 30 minutes.

As shown in FIG. 1, prepainted carrier film 20 is clamped into a stretcher frame 14 which can be moved horizontally into an oven (not shown) for heating. We have used an oven equipped with quartz heaters for rapid heating the film to a temperature of approximately 300° F. An optical thermometer was used to monitor the surface temperature of the film in the oven. Once the surface temperature reaches the desirable forming temperature, the stretcher frame 14 is rapidly moved out of the oven and positioned over the top of vacuum box 12.

Figure 2:
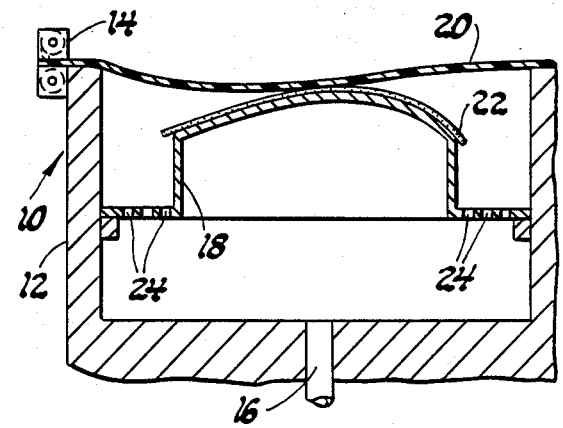
FIG. 2 is a schematic showing vacuum is applied from the bottom of the forming box to pull down a film onto the substrate.

FIG. 2 shows a heated prepainted carrier film 20 sagging from its clamped position into vacuum box 12. Vacuum is then pulled immediately from the bottom of vacuum box 12 through vacuum port 16 to evacuate air trapped under carrier film 20.

Figure 3:
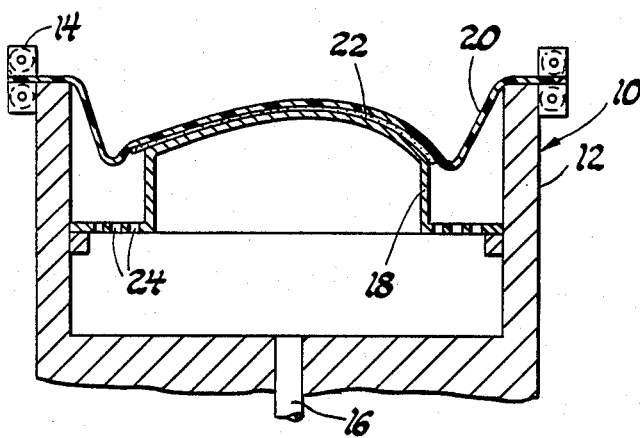
FIG. 3 is a schematic showing a prepainted carrier film completely covered a substrate under vacuum.

FIG. 3 shows that as air is evacuated out of vacuum box 12, prepainted carrier film 20 is pulled down further onto substrate 22 to cover the entire surface of the substrate. Carrier film 20 adheres to the substrate on contact by the adhesive coated on the bottom surface of the carrier film 20.

Figure 4:
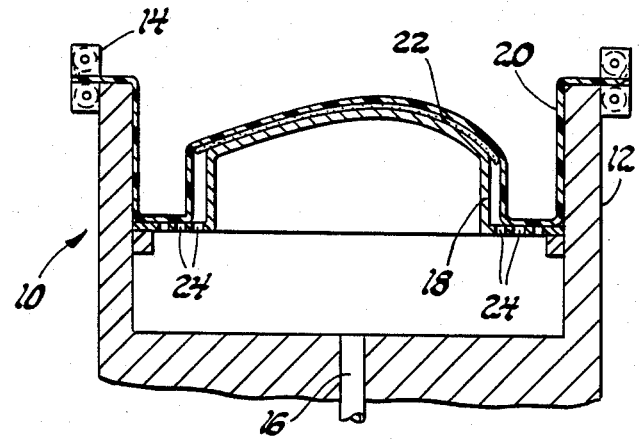
FIG. 4 is a schematic showing a prepainted film pulled down evenly over the edges of the substrate.

FIG. 4 shows the final stage of the vacuum forming process wherein more air is evacuated out of vacuum box 12. It is seen that film 20 is now pulled down evenly over edges of support box 18. The substrate 22 with the prepainted carrier film 20 adhered to it can now be removed out of vacuum box 12 to trim off the excess film along the edges of the substrate.

Figure 5:
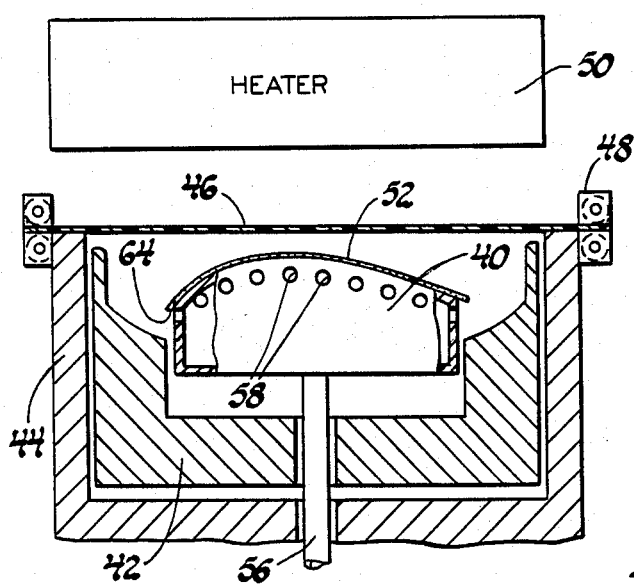
FIG. 5 is a schematic showing our alternate embodiment wherein a support buck, an inner box, and an outer vacuum box are used.
Figure 6:
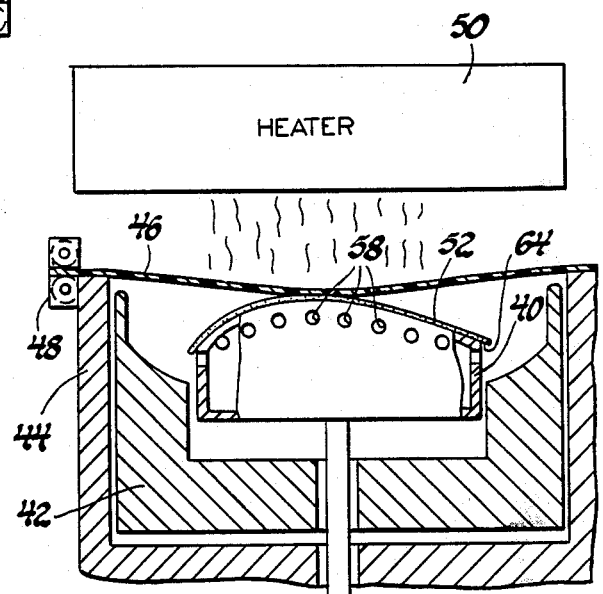
FIG. 6 is a schematic showing vacuum pulled from under the support buck after the inner box is raised.

An alternate embodiment of our invention is shown in FIG. 5–8. In this alternate embodiment a movable support buck and a movable inner vacuum box are used instead of the stationary support buck used in the previous embodiment. This is shown in FIG. 5 where a movable support buck 40 and a movable inner box 42 are mounted inside an outer vacuum box 44. Note that both the support buck 40 and the inner box 42 are mounted on air cylinders which can be moved up and down as desired. FIG. 5 also shows a prepainted carrier film 46 mounted in stretcher frame 48 which can be moved rapidly in and out of a heater 50. At the start of the forming cycle, (FIG. 5), substrate 52 for a body part is placed on support buck 40 with the support buck 40 in its up position. The prepainted carrier film 46 is prepared similarly as in the previous embodiment. The carrier film 46 is placed under heater 50 until the surface temperature of the film reaches 300° F. and starts sagging. It is then rapidly moved out of the heater and positioned over vacuum box 44. The support buck 40 is rapidly raised such that carrier film 46 touches the highest point of substrate 52. Vacuum is drawn through vacuum port 56 to evacuate trapped air under carrier film 46. The evacuation of air is carried out by pulling vacuum around the edges of the substrate 52 through vacuum holes 58 drilled in the top edge of support buck 40.

Figure 7:
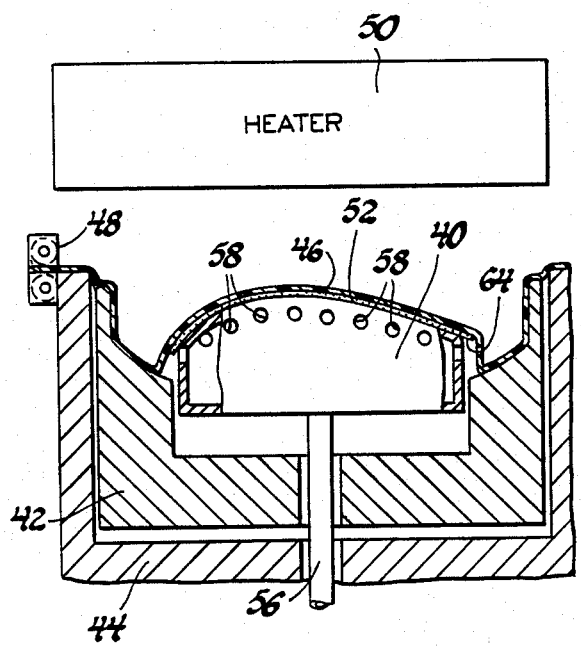
FIG. 7 is a schematic showing a prepainted carrier film stretched down to cover the substrate and sides of the inner box.
Figure 8:
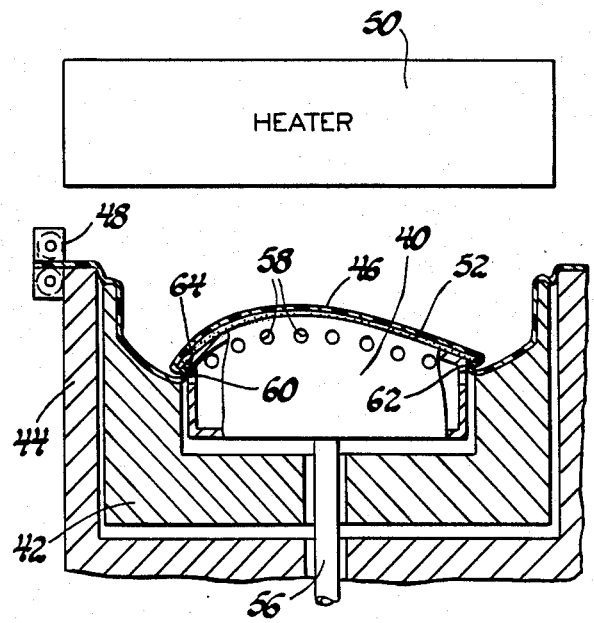
FIG. 8 is a schematic showing the support buck in a lowered position for the to edge-wrapping of the substrate.

FIG. 7 shows prepainted carrier film 46 continues to be drawn down onto the substrate 52 and adheres to it on contact with no air entrapment. As the carrier film 46 reaches the edges of substrate 52 and continues to be drawn down onto the sides of support buck 40, it creates a stretched film section between the edges of the substrate and the sides of the support buck 40. In the final step of our stretch forming process as shown in FIG. 8, support buck 40 together with substrate 52 on it are dropped approximately one inch causing the stretched carrier film 46 to droop at 60. As air being continuously withdrawn from the cavity between support buck 40 and inner box 42, the stretched carrier film 46 is pulled under the substrate 52 at 62 where it adheres on contact to the backside edges 64 of substrate 52. This last step of the stretch forming process wherein support buck 40 and substrate 52 are both dropped accomplishes an important task of edge-wrapping the carrier film to the backside of the substrate. This, when done in an automated manner, greatly saves the manual labor otherwise required to edge wrap each substrate. The substrate with the prepainted carrier film adhered to it may now be removed for trimming operation.

It should be noted that even though we have demonstrated our process with a large substrate member such as an automobile body panel, our novel process can be used for any automobile body panels, large or small. For instance, large body parts such as panels for a door, hood, or truck lid etc. and small body parts such as body side moldings can all be made by our novel process.

We discovered that during our stretch forming process, a deformation of between 20% to 150% has occurred in the stretched carrier film and in the color coat layer when the film sagged after heating and then pulled by vacuum onto the substrate. The contour and configuration of the automobile part determines largely the extent of localized deformation of the carrier film.

We also used the term "facing sheet" to define a carrier film that is coated with at least one layer of a color coat and at least one layer of a clear coat. We discovered that in order to retain substantially the same color appearance of the facing sheets after stretching as prior to stretching, a clear coat layer must be added on top of the color coat layer prior to the vacuum thermoforming process. One of the clear coat formulations we used is supplied by PPG Industries (UEC-1000). UEC-1000 is a melamine cured polyester clear coat applied at a viscosity of 30 sec. on a Fisher #2 viscosity cup. The viscosity was reduced to this value by the use of methyl ethyl ketone. We have discovered that to achieve proper curing of UEC-1000, it is necessary to add 5% by weight of an aromatic sulfonic acid catalyst solution. One such catalyst is supplied by PPG as PPG 900-1616. It is a sulfonic acid catalyst supplied as 30% solids in isopropanol. It can be suitably used in the range of 2.5 to 7.5 volume percent of the clear coat. The catalyst allows the clear coat layer to cure under the same conditions as the Durethane® 101 topcoats. Durethane® 101 is a melamine cured polyster-polyurethane solvent-based topcoat supplied by PPG at a viscosity range of 21 to 23 sec. Fisher #1 viscosity. The viscosity was reduced to this value by the use of xylene and toluene.

In our vacuum thermoforming process where a prepainted carrier film is assembled to an automobile body part, a two dimensional film must be stretched in order to conform to the surface of a three dimensional automobile body part. As a consequence of this stretching process, the color and gloss appearance appearance of the prepainted carrier film is degraded or deteriorated.

We have found that one simple measurement of the appearance is the measurement of the 20° gloss readings by using a Gardner 20° gloss meter. When a color coat on a prepainted carrier film is stretched, the shinny surface of the color coat layer becomes dull. This degradation in the gloss readings of the color coat makes the color appear different after the stretching process incurred in vacuum thermoforming.

One method to remedy the problem of the degradation in gloss is to spray a clear coat layer on the stretched color coat surface. However, another problem arises when such attempt is made. We have discovered that since the stretched surface of the color coat layer is under stress, the spraying of a clear coat layer on top of the color coat layer after stretching can cause severe stress-cracking problems. Since most clear coat formulations that are commercially available contain one kind of organic solvent or another, these organic solvents initiate cracks in the stressed color coat layer.

It is, therefore, our novel discovery that for most clear coat systems, in order to use a clear coat layer to improve the gloss on a dull surface of a stretched color coat, the clear coat layer should be applied on top of the color coat layer prior to the stretching process and, further, should be cured by baking to completely remove the organic solvents contained in the clear coat formulation prior to such stretching.

It is also our novel discovery that in order to improve the gloss appearance of the color coat after stretching or, in other words, to retain substantially the same color and gloss appearance of the color coat as prior to such stretching, a critical minimum thickness of the clear coat must be applied on top of the color coat layer. By substantially retaining the same color and gloss appearance of the color coat as prior to such stretching, we mean that in general, parameters such as the 20° gloss reading does not deteriorate by more than 20 to 30, and parameters such as the colorimeter reading of L, A, B values, do not vary by more than ±1.

We have found that when the 20° gloss reading does not deteriorate by more than 20 to 30 from the initial value before stretching and when the L, A, B values do not change by more than ±1, the color and gloss appearance of the stretched facing sheet remains acceptable under normal visual examination.

It is a further novel discovery that the critical minimum thickness of clear coats required in order to retain substantially the same color and gloss appearance of our facing sheet after stretch as prior to such stretch is dependent upon several parameters.

First, we have classified color coats into two main categories, i.e. the color coat formulations containing additive of flakes and color coat formulations containing no additive of flakes, (generally known as metallic paint and non-metallic paint, respectively). The first parameter that the critical minimum thickness required for the clear coat layer is dependent upon is the type of color coat formulations, i.e. whether it contains flakes or not. By flakes, we mean flakes either of metallic nature such as aluminum or iron flakes or non-metallic flakes such as mica or other mineral type flakes.

Figure 9:
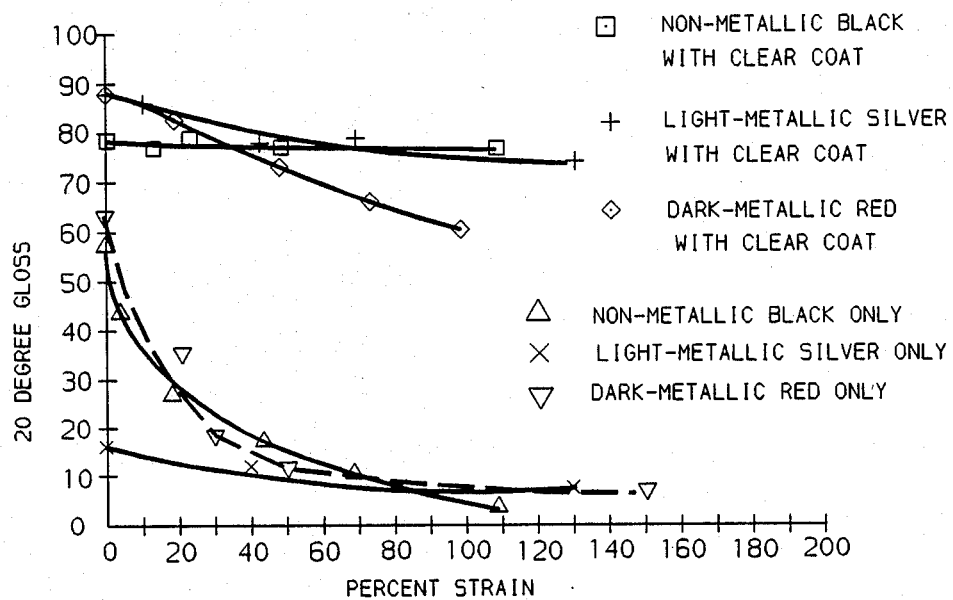
FIG. 9 is a graph showing the general effect of clear coat on gloss readings for color coat formulations both with and without flakes.

FIG. 9 is a graph showing the general effect of adding a clear coat layer on a stretched color coat layer as measured by the 20° gloss readings at various percent strain levels. The effect of clear coat on three colors, namely non-metallic black, light metallic silver and dark metallic red is shown.

It is seen in FIG. 9 that without the clear coat layer, the gloss readings of all three colors suffered severe degradation to unacceptable values even at relatively low percent strain levels. It is our experience that for most colors used in painting automobile body parts, a value between 50 to 70 in 20° gloss readings would be considered acceptable.

In FIG. 9, it is seen that without clear coat the gloss readings of all three colors degraded to only 10 when the facing sheets are stretched to a strain of 100%. When clear coats are added onto the color coats, all three colors exhibited acceptable gloss readings at higher than 65 at 100% strain. It should be noted that the thicknesses of the clear coat layers applied on the three different colors are not the same.

For color coat formulations that do not contain additives of flakes, i.e. generally known as non-metallic paints, the critical minimum thickness of the clear coat layer required in order to retain substantially the same color and gloss appearance is small.

Figure 10:
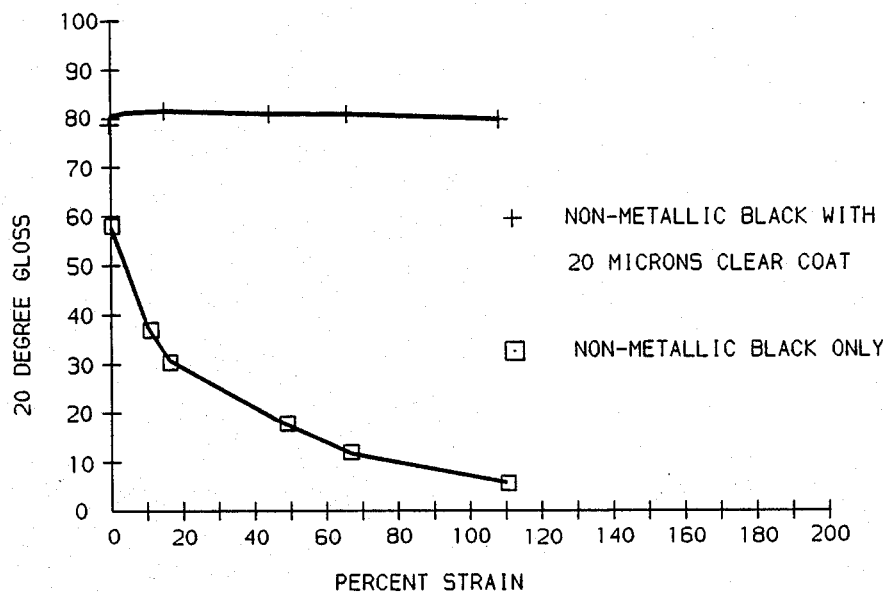
FIG. 10 is a graph showing the effect of 20 microns thick clear coat on gloss readings for a non-metallic black color coat.

FIG. 10 shows the effect of clear coat on such a color, i.e. non-metallic black. It is seen that without clear coat, the 20° gloss reading dropped to approximately 25 at 25% strain and to approximately 10 at 100% strain. Neither of these readings would have been acceptable on an automobile body part. When 20 microns thickness clear coat is applied on the color coat layer and cured with the color coat layer prior to the stretching process, the 20° gloss readings of non-metallic black remain substantially unchanged at a reading of 80 when the facing sheet is stretched to strains as high as 100%. We have observed a similar effect in other non-metallic colors such as white, beige, brown, etc. For color coat formulations that contain additives of flakes, i.e. generally known as metallic paints, we discovered that the critical minimum thickness of the clear coat layer required in order to retain substantially the same color and gloss appearance is much larger. In the normal range of clear coat thickness applied in production automobile body parts of between 10 to 20 microns, there was absolutely no improvement in the gloss and color appearance in the color coat on a stretched facing sheet. It is, therefore, our novel discovery that a much higher range of thicknesses of the clear coat layer is required in order to retain substantially the same color and gloss appearance of a color coat containing additives of flakes. For color coats containing additive of flakes, i.e. metallic paints, we made a thorough study on the effect of clear coat on the color and gloss appearance for metallic paints of different colors and for different strain levels after stretching.

We have discovered that in general, the higher the flake content of the metallic paint, the larger the clear coat thickness is required in order to retain the color and gloss appearance of the color coat after stretching. For instance, for a dark red metallic paint which containing twelve pounds of pigments in 100 pounds resin and the pigment containing 50% maroon pigment, 17% transparent iron oxide, 24% manestral red, and 8% aluminum flakes of number 6 size. The total flake content of this dark red metallic paint is less than 1 weight percent. In a medium blue metallic paint containing 15 pounds pigments in 100 pounds resin, the pigment portion contains 91% aluminum flakes of number 8 medium-coarse size and 9% blue pigments. The total flake content in this medium blue metallic paint is approximately 12 weight percent. We have discovered that in order to retain substantially the same color and gloss appearance of the medium blue metallic color coat, higher range of clear coat thickness is required than that for the dark red metallic color coat.

Figure 11:
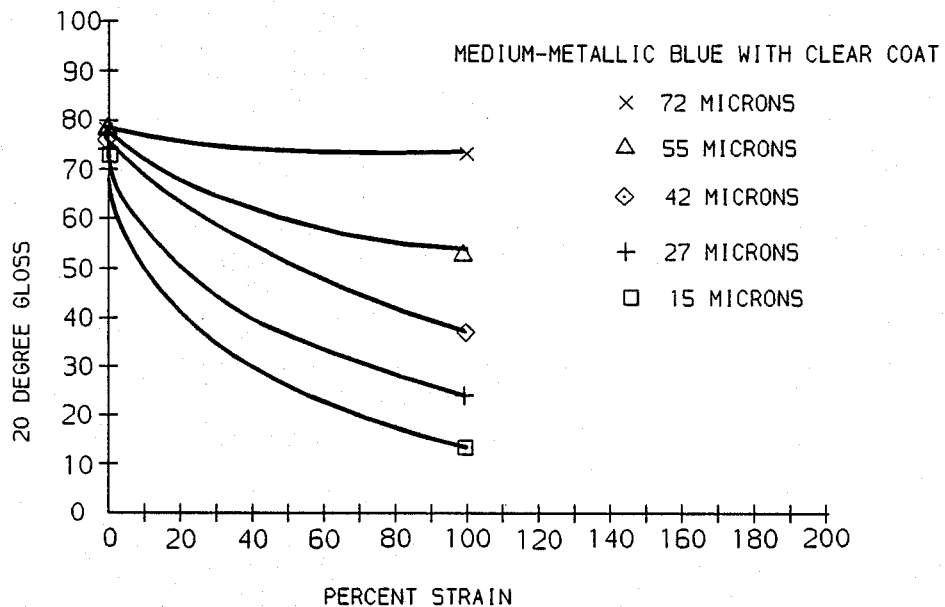
FIG. 11 is a graph showing the effect of various clear coat thicknesses on gloss readings for a medium-metallic blue color coat.

In FIG. 11, the effect of clear coat on medium metallic blue color coat as a variable of percent strain is shown. It is seen that at 100 percent strain, in order to maintain a 20° gloss reading between 50 and 60, a clear coat thickness of 55 microns is required for the stretched facing sheet. This clear coat thickness requirement is lower when the facing sheet is stretched at a lower percent strain. For instance, at 25% strain, in order to maintain a 20° gloss reading, only 27 microns thickness of clear coat would be necessary for the stretched facing sheet coated with the medium metallic blue color coat.

The critical minimum thickness of clear coat required is the largest in a light metallic color coat. For instance, in a light metallic silver color coat containing 22 pounds flakes in 100 pounds resin which relates to a flake content of approximately 18 weight percent, the thickness of clear coats required in order to retain substantially the same color and gloss appearance as prior to stretching is significantly higher than that required for the dark metallic and medium metallic color coats.

Figure 12:
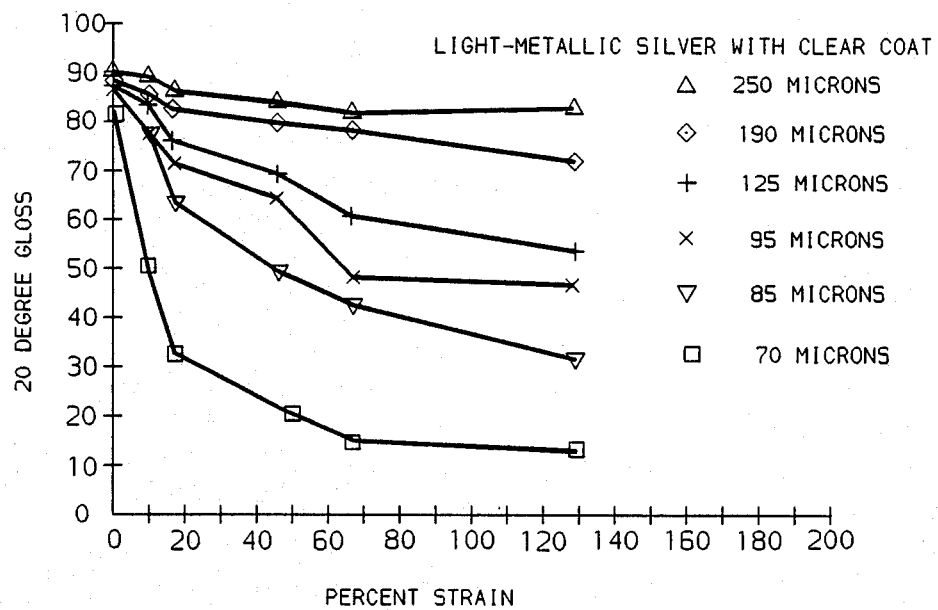
FIG. 12 is a graph showing the effect of various clear coat thicknesses on gloss readings for a light-metallic silver color coat.

FIG. 12 shows the critical minimum clear coat thickness required for the light metallic silver color coat. It is seen that when the facing sheet is stretched at 100 percent strain, in order to maintain a 20° gloss reading at between 50 and 60, 125 microns thickness of clear coat is necessary. When the facing sheet is stretched to a lower percent strain of 25 percent, only approximately 75 microns thickness of clear coat is required to maintain a gloss reading between 50 and 60.

Figure 13:
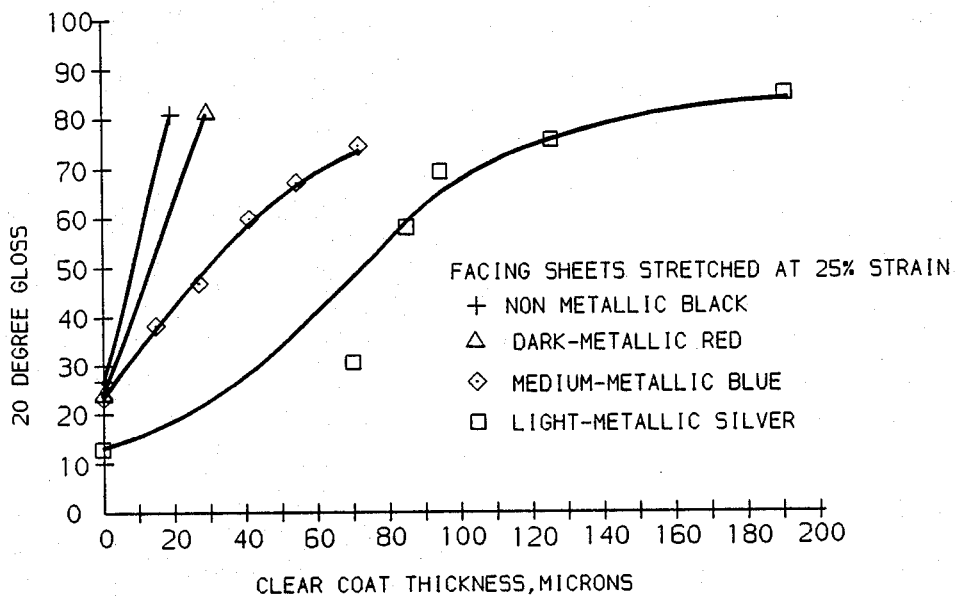
FIG. 13 is a graph showing the effect of various clear coat thicknesses on gloss readings for non-metallic and metallic color coats stretched at 25% strain.
Figure 14:
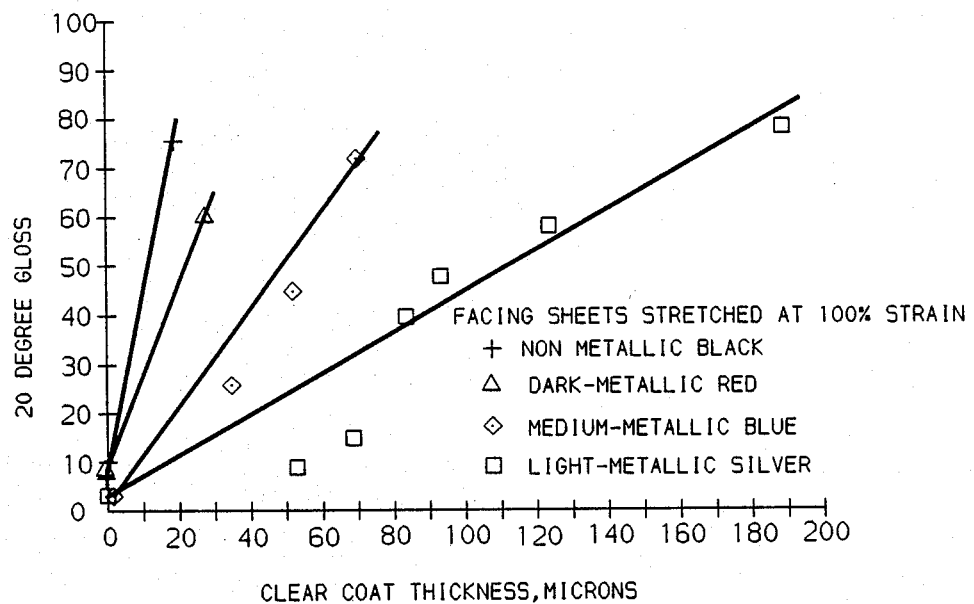
FIG. 14 is a graph showing the effect of various clear coat thickness on gloss readings for non-metallic and metallic color coats stretched at 100% strain.

FIGS. 13 and 14 further show the effect of clear coat thickness on the 20° gloss reading for four different colors, namely, a non-metallic black, a dark metallic red, a medium metallic blue and a light metallic silver color coat at two different strain levels of 25 percent and 100 percent. It is seen (FIG. 14) that in order to achieve a maximum gloss reading of 80 for the light metallic silver color coat stretched at 100% strain, a minimum of 180 microns thickness of clear coat is required. Similarly, for the same color coat stretched at 25% strain (FIG. 13), a minimum thickness of 150 microns of clear coat is required to achieve the maximum gloss reading of 80.

We have discovered that for a non-metallic paint that contains no flakes, i.e. a non-metallic black color coat, in order to retain substantially the same color and gloss appearance at a 20° gloss level between 50 and 60, a minimum clear coat thickness of 10 microns is required. To achieve a maximum gloss reading on a stretched non-metallic color coat such as white, we have found that as high as 180 microns thickness of clear coat may be applied. This is true even though minimal improvement is gained when the clear coat thickness applied is above 40 to 50 microns thick.

For a metallic color coat containing flakes, in order to retain substantially the same color and gloss appearance as prior to the stretching process, i.e. maintaining a 20° gloss reading at between 50 and 60, a minimum thickness of 20 microns of clear coat must be applied on the stretched facing sheet. To achieve the maximum gloss in a light metallic color coat, as high as 180 microns thickness of clear coat may be used. For facing sheets stretched at a lower percent strain of 25%, a minimum clear coat thickness of 15 microns is necessary to maintain a 20° gloss reading on a stretched facing sheet at an acceptable level between 50 and 60. At this lower percent strain level of 25 percent, as high as 120 microns thickness of clear coat may be used in a light metallic silver color to achieve the maximum 20° gloss reading of 80.

We have found that in our vacuum thermoforming process, the most severe percent strain occurred in a contoured automobile body part is approximately 100 percent. In most cases where no sharp contour is involved, the percent strain seen in the stretched facing sheet is in the range between 10 to 50 percent.

In a mass production system as that used in the automotive industry, large rolls of carrier films are coated with at least one color coat layer and a clear coat layer and baked through a baking cycle to cure both layers and stored for future usage when facing sheets of the specific color is called for. Our novel invention enables the complete elimination of paint facilities in an automobile assembly plant where facing sheets may be vacuum formed directly onto vehicle body parts in an automated process.

While our invention has been described in terms of a preferred embodiment thereof, it is to be appreciated that those skilled in the art will readily apply these teachings to other possible variations of the invention.

The embodiments of the invention in which an exclusive property or privilege is claimed are defined as follows:

1. A method of making paint coated parts each comprising a stretched facing sheet layer and an underlying substrate layer, method comprising the steps of:
   providing a facing sheet layer having a top surface and a bottom surface wherein said top surface is first painted to a predetermined color by a color coat formulation not containing any flakes and then coated with at least one layer of a clear coat such that the total clear coat thickness is no less than 10 microns,
   curing said color coat and said at least one layer of clear coat,
   heating said facing sheet to a temperature at which said sheet becomes sufficiently pliable and stretchable for vacuum forming,
   positioning said heated facing sheet over said substrate and
   introducing a layer of an adhesive between said heated facing sheet and said substrate layer before contacting said facing sheet with said substrate, and
   drawing vacuum from under said substrate layer so that said facing sheet stretches to a strain of at least 10% under said vacuum, and conforms and adheres to said substrate in such a way that said clear coat layer retains the gloss appearance of said facing sheet at a gloss reading of at least 50 as measured by a Gardner 20° gloss meter.

2. A method of making paint coated automobile parts each comprising a stretched facing sheet layer and an underlying substrate layer, said method comprising the steps of:
   providing a facing sheet layer having a top surface and a bottom surface wherein the top surface is first painted to a predetermined color by a color coat formulation not containing any flakes and then coated with at least one layer of clear coat such that the total clear coat thickness is no less than 10 microns and said bottom surface is coated with a layer of adhesive,
   curing said color coat and said at least one layer of clear coat,
   heating said facing sheet to a temperature at which said sheet becomes sufficiently pliable and stretchable for vacuum forming,
   positioning said heated facing sheet over said substrate,
   drawing vacuum from under said substrate layer so that said facing sheet stretches to a strain of at least 10% under said vacuum and conforms and adheres to said substrate in such a way that said clear coat layer retains the gloss appearance of said facing sheet at a gloss reading of at least 50 as measured by a Gardner 20° gloss meter.

3. A method of making paint coated parts each comprising a stretched facing sheet layer and an underlying substrate layer, said stretched facing sheet layer having a top surface and a bottom surface wherein said top surface is painted to a predetermined color with a color coat formulation not containing any flakes and then coated with at least one layer of a clear coat such that the total clear coat thickness is between 10 to 180 microns,
   curing said color coat and said at least one layer of clear coat,
   heating said facing sheet to a temperature at which said sheet becomes sufficiently pliable and stretchable for vacuum forming,
   positioning said heated facing sheet over said substrate,
   introducing a layer of an adhesive between said heated facing sheet and said substrate layer before contacting said facing sheet with said substrate,
   drawing vacuum from under said substrate layer so that said facing sheet stretches under said vacuum at one or more predetermined locations to a strain of up to 100%,
   conforming and adhering said stretched facing sheet to said substrate in such a way that said clear coat layer retains the gloss appearance of said facing sheet at a gloss reading of at least 50 as measured by a Gardner 20° gloss meter.

4. A method of making paint coated parts each comprising a stretched facing sheet layer and an underlying substrate layer, said method comprising:
   providing a facing sheet layer having a top surface and a bottom surface wherein said top surface is painted to a predetermined color with a color coat formulation not containing any flakes and then coated with at least one layer of a clear coat such that the total clear coat thickness is between 10 to 180 microns and said bottom surface is coated with a layer of adhesive,
   curing said color coat and said at least one layer of clear coat,
   heating said facing sheet to a temperature at which said sheet becomes sufficiently pliable and stretchable for vacuum forming,
   positioning said heated facing over said substrate, and
   drawing vacuum from under said substrate layer so that said facing sheet stretches under said vacuum pressure at one or more predetermined locations to a strain of up to 100%,
   conforming and adhering said stretched facing sheet to said substrate in such a way that said clear coat layer retains the gloss appearance of said facing sheet at a gloss reading of at least 50 as measured by a Gardner 20° gloss meter.

* * * * *